United States Patent
Kabra et al.

(10) Patent No.: US 11,393,171 B2
(45) Date of Patent: Jul. 19, 2022

(54) MOBILE DEVICE BASED VR CONTENT CONTROL

(71) Applicant: International Business Machines Corporation, Armonk, NY (US)

(72) Inventors: Namit Kabra, Hyderabad (IN); Smitkumar Narotambhai Marvaniya, Bangalore (IN); Yannick Saillet, Stuttgart (DE); Kunjavihari Madhav Kashalikar, Hudson, MA (US)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 16/934,280

(22) Filed: Jul. 21, 2020

(65) Prior Publication Data
US 2022/0028168 A1 Jan. 27, 2022

(51) Int. Cl.
| | |
|---|---|
| *G06T 19/00* | (2011.01) |
| *G06F 3/0484* | (2022.01) |
| *G02B 27/01* | (2006.01) |
| *G06F 3/04815* | (2022.01) |
| *G06V 20/20* | (2022.01) |
| *G06V 20/64* | (2022.01) |

(52) U.S. Cl.
CPC ........ *G06T 19/006* (2013.01); *G02B 27/0172* (2013.01); *G06F 3/0484* (2013.01); *G06F 3/04815* (2013.01); *G06V 20/20* (2022.01); *G06V 20/64* (2022.01)

(58) Field of Classification Search
None
See application file for complete search history.

(56) References Cited

U.S. PATENT DOCUMENTS

| | | | | |
|---|---|---|---|---|
| 9,270,943 | B2 * | 2/2016 | Ehmann | G06F 3/1454 |
| 9,767,613 | B1 * | 9/2017 | Bedikian | G06F 3/04845 |
| 10,353,532 | B1 * | 7/2019 | Holz | G06F 3/0304 |
| 10,429,923 | B1 * | 10/2019 | Johnston | G02B 27/0176 |
| 2013/0241920 | A1 | 9/2013 | Yang | |
| 2014/0306866 | A1 * | 10/2014 | Miller | H04L 67/38 |
| | | | | 345/8 |
| 2016/0232715 | A1 | 8/2016 | Lee | |

(Continued)

FOREIGN PATENT DOCUMENTS

| | | |
|---|---|---|
| CN | 106095235 A | 11/2016 |
| CN | 107896508 A | 4/2018 |

(Continued)

OTHER PUBLICATIONS

Unknown, "Navi turns phone into VR controller", Hypergrid Business, Press Release, Sep. 28, 2015, 5 pages.

(Continued)

*Primary Examiner* — Martin Mushambo
(74) *Attorney, Agent, or Firm* — James L. Olsen (57) ABSTRACT

Aspects of the present disclosure relate to controlling virtual reality (VR) content displayed on a VR head mounted display (HMD). Communication can be established between a computer system, a VR HMD, and a mobile device. A user input configured to control VR content displayed on a display of the VR HMD can be received on the mobile device. The VR content displayed on the VR HMD can then be controlled based on the user input received on the mobile device.

17 Claims, 7 Drawing Sheets

(56) References Cited

U.S. PATENT DOCUMENTS

| | | | |
|---|---|---|---|
| 2016/0239080 A1* | 8/2016 | Marcolina | G06F 3/017 |
| 2017/0038964 A1* | 2/2017 | Jang | G06F 3/0486 |
| 2017/0185144 A1 | 6/2017 | Li | |
| 2017/0364229 A1 | 12/2017 | Jain et al. | |
| 2017/0364960 A1* | 12/2017 | Huang | G06Q 30/0277 |
| 2018/0004386 A1* | 1/2018 | Hinckley | G06F 3/0416 |
| 2018/0008142 A1* | 1/2018 | Garoon | A61B 3/0025 |
| 2018/0024630 A1* | 1/2018 | Goossens | G06F 3/011 |
| | | | 345/156 |
| 2018/0039341 A1* | 2/2018 | Du Bois | G06F 3/04815 |
| 2018/0239419 A1* | 8/2018 | Oh | H04B 10/697 |
| 2018/0246565 A1* | 8/2018 | Moon | G06F 3/012 |
| 2019/0349642 A1* | 11/2019 | Okuda | G06F 3/011 |
| 2019/0362562 A1* | 11/2019 | Benson | G06K 9/00671 |
| 2020/0004321 A1* | 1/2020 | Kawano | G09G 5/377 |
| 2021/0375052 A1* | 12/2021 | Abiko | A63F 13/216 |

FOREIGN PATENT DOCUMENTS

| | | |
|---|---|---|
| CN | 109885174 A | 6/2019 |
| CN | 111338546 A | 6/2020 |

OTHER PUBLICATIONS

Aseeri et al., "Poster: Virtual Reality Interaction Using Mobile Devices", 2013 IEEE Symposium on 3D User Interfaces (3DUI), Mar. 16-17, 2013, pp. 127-128.

Wagner et al., "History and Future of Tracking for Mobile Phone Augmented Reality", 2009 International Symposium an Ubiquitous Virtual Reality, Jul. 8-11, 2009 , pp. 7-10.

Henrysson et al., "Virtual Object Manipulation using a Mobile Phone", ICAT '05: Proceedings of the 2005 International conference on Augmented tele-existence, Dec. 2005, pp. 164-171.

Jain et al., "User Learning and Performance with Bezel Menus", CHI '12: Proceedings of the SIGCHI Conference on Human Factors in Computing Systems, May 5-10, 2012, pp. 2221-2230.

Jain et al., "Comparison of Phone-based Distal Pointing Techniques for Point-Select Tasks", Interact 2013: Human-Computer Interaction, Conferences Paper, 8 pages.

Unknown, "Samsung Patent Reveals Next-Gen Gear VR Headset with Multiple new Features, Major Accessories & Applications", Patently Mobile, Jun. 4, 2017, 11 pages.

Serrano et al., "Bezel-Tap Gestures: Quick Activation of Commands from Sleep Mode on Tablets", Submitted on Feb. 16, 2015, 12 pages.

Li et al., "BezelCursor: Bezel-Initiated Cursor for One-Handed Target Acquisition on Mobile Touch Screens", IGI Global Publisher of Timely Knowledge, 2016, 1 page.

Menzner et al., "Above Surface Interaction for Multiscale Navigation in Mobile Virtual Reality", Feb. 7, 2020, 10 pages.

Liang et al., "VRMController: An input device for navigation activities in virtual reality environments", VRCAI '16, Dec. 3-4, 2016, pp. 455-460.

Du et al., "Tilt & Touch: Mobile Phone for 3D Interaction", UbiComp'11, Sep. 17-21, 2011, 2 pages.

Kovarova et al., "Can virtual reality be better controlled by a smart phone than by a mouse and a keyboard?", International Conference on Computer Systems and Technologies—CompSysTech'14, Jun. 27-28, 2014, pp. 317-324.

Mell et al., "The NIST Definition of Cloud Computing", Recommendations of the National Institute of Standards and Technology, Sep. 2011, 7 pages.

"Patent Cooperation Treaty PCT International Search Report", Applicant's file reference P201911451PCT01, International application No. PCT/CN2021102231, International filing date Jun. 25, 2021, Priority Date Jul. 21, 2020, 9 pages.

* cited by examiner

MOBILE DEVICE BASED VR CONTENT CONTROL

BACKGROUND

The present disclosure relates generally to the field of virtual reality, and in particular to controlling virtual reality systems using mobile devices.

Virtual Reality (VR) systems simulate virtual environments using computer technology. VR systems provide sensory data (e.g., audio and visual data) to users such that the users experience an immersive environment. VR systems typically include a head-mounted display (HMD) which a user can wear to visualize a simulated environment. The simulated environment can be similar to the real world or entirely fictional.

SUMMARY

Embodiments of the present disclosure relate to a method, system, and computer program product for controlling virtual reality (VR) content displayed on a VR head-mounted display (HMD). Communication can be established between a computer system, a VR HMD, and a mobile device. A user input configured to control VR content displayed on a display of the VR HMD can be received on the mobile device. The VR content displayed on the VR HMD can then be controlled based on the user input received on the mobile device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of virtual reality, and in particular to controlling virtual reality systems using mobile devices. While the present disclosure is not necessarily limited to such applications, various aspects of the disclosure can be appreciated through a discussion of various examples using this context.

Virtual Reality (VR) systems simulate virtual environments using computer technology. VR systems commonly include a head mounted display (HMD) which provides, among other data, visual sensory data to a user wearing the HMD. A VR system, such as the OCULUS RIFT® or HTC VIVE®, typically includes controllers which can be held in a user's hands such that they can interact with the VR environment. The controllers can serve as the user's hands during VR use, allowing the user to manipulate objects or views within the VR environment.

However, controllers associated with VR systems are typically expensive. Further, some controllers can include many control buttons and/or control techniques that may be difficult for a user to become comfortable with. This can hinder the user's VR experience. Further still, dedicated VR controllers only add to the hardware associated with a VR system, which can already include multiple sensors (for tracking), an HMD, a computer system, and necessary cords and ports for interconnecting the associated components. As such, there is a need for a solution which can be substituted in place of dedicated VR controllers that provides intuitive functionalities for controlling VR content.

Aspects of the present disclosure relate to methods for controlling virtual reality (VR) content displayed on a VR head-mounted display (HMD). Communication can be established between a computer system, a VR HMD, and a mobile device. A user input configured to control VR content displayed on a display of the VR HMD can be received on the mobile device. The VR content displayed on the VR HMD can then be controlled based on the user input received on the mobile device.

By allowing users to control VR content via mobile devices, intuitive mobile device-based controls users are already acclimated to can be used to control the VR content instead of dedicated VR controllers, which may be difficult for users to become comfortable with. Further, rather than needing to purchase additional hardware, users can simply connect the mobile devices they regularly use to a VR system such that the VR system can be controlled. Further still, the range of control options is expanded based on the inputs available to the connected mobile device. For example, controls such as in-air controls, bezel-based controls, touch controls, and motion controls can be used to control VR content rather than being limited to the control mechanisms available to a dedicated VR controller.

Figure 1:
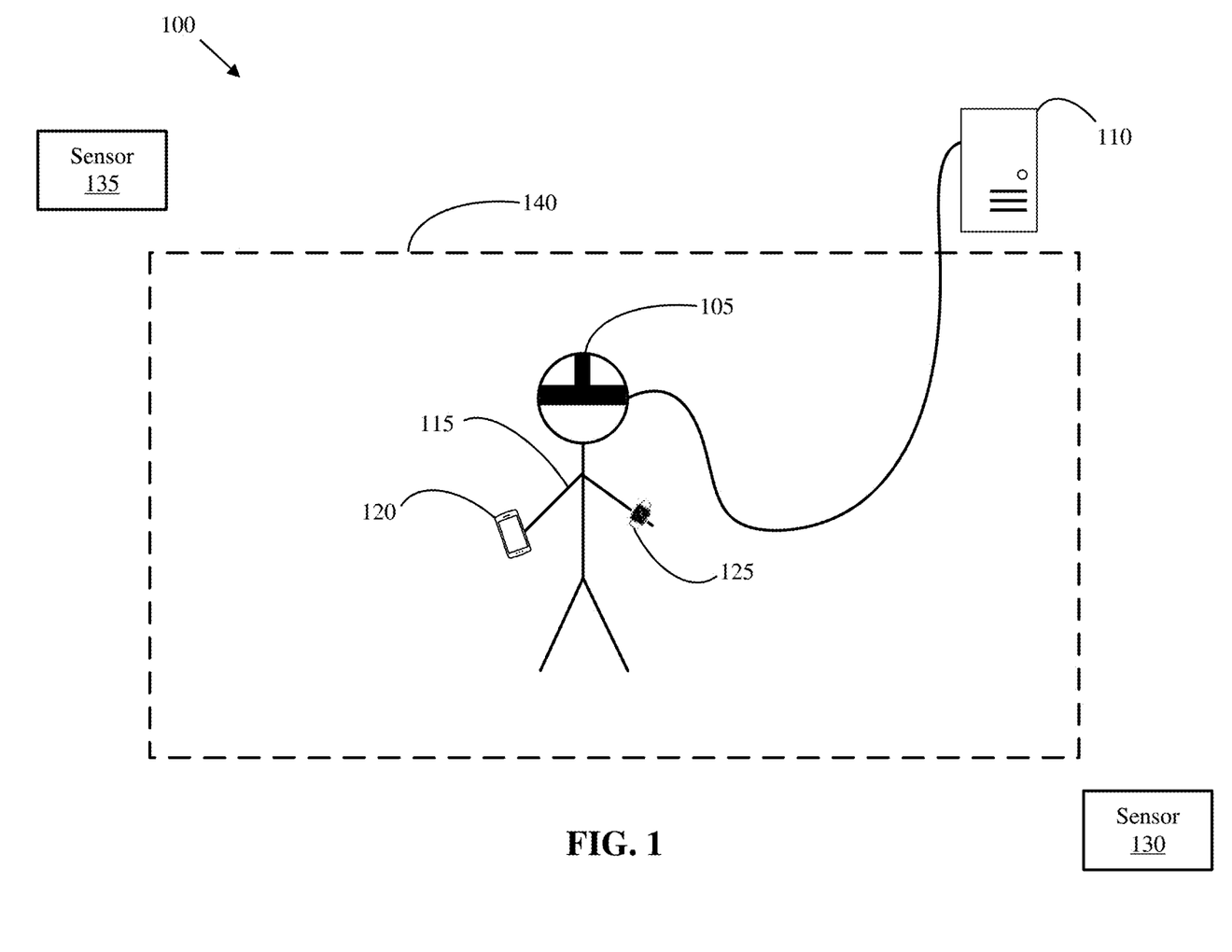
FIG. 1 depicts a VR environment in which illustrative embodiments of the present disclosure can be implemented.

Referring now to the figures, FIG. 1 is a diagram illustrating an example virtual reality (VR) environment 100, in accordance with embodiments of the present disclosure. The virtual reality environment 100 includes a VR head-mounted display (HMD) 105 communicatively coupled to a computer system 110. A VR user 115 is actively using the VR HMD 105 and controlling VR use (e.g., VR gameplay) using a smart phone 120 (e.g., controller 215-1 of FIG. 2) and a smart watch 125 (e.g., controller 215-2 of FIG. 2).

Prior to using the VR HMD 105, the VR user 115 can set up the VR environment 100. Initially, the VR user 115 can install required VR software on the computer system 110 and configure communicative coupling between the computer system 110, the VR HMD 105, a first sensor 130, and a second sensor 135. Upon initiation of the VR software on the computer system 110, the VR user 115 can be prompted for a room set-up. The room set-up can ensure that the VR HMD is properly calibrated based on characteristics of the VR user 115 (e.g., a proper height and viewing direction) and that the VR user 115 does not collide with nearby objects. The room set-up can include indicating the location of the ground, the height of the user, and the direction the user 115 will be oriented during VR use.

The room set-up can further include defining a VR boundary 140. The VR boundary 140 can be defined to ensure that the VR user 115 does not collide with stationary objects in the room. This can be completed by displaying the VR boundary 140 to the VR user 115 while using the VR HMD 105 such that the VR user 115 remains within the VR boundary 140 and does not collide with nearby objects (e.g., such as nearby furniture, a television, or a countertop). In embodiments, the VR boundary 140 may only be displayed while the user is moving (e.g., to minimize clutter when immersed in the VR environment).

After configuring the VR environment 100, the VR user 115 can wear the VR HMD 105 and initiate VR use (VR gameplay). The sensors 130 and 135 can be configured to track the VR user 115 when immersed in VR. For example, the sensors 130 and 135 can track the VR HMD 105, the smart phone 120, and the smart watch 125 to facilitate updating the VR user's 115 location within virtual reality. Further, the sensors 130 and 135 can use utilize the tracking of the VR HMD 105, smart phone 120, and smart watch 125 to determine the VR user's position with respect to the VR boundary 140. This can be used to alert the VR user 115 if they are approaching the VR boundary 140 in order to prevent collision with nearby objects.

In embodiments, the controls (e.g., touch-based, bezel-based, motion-based, and in-air controls) of smart phone 120 and smart watch 125 can be used to control VR use. Thus, the smart phone 120 and smart watch 125 can operate to manipulate objects or viewing angles within VR gameplay. Examples of controls that can be completed using the smart phone 120 and smart watch 125 include aiming (e.g., moving a camera view of a user from the perspective of the user), panning (e.g., repositioning a top-down view of a virtual-based map, moving a camera view along a horizontal plane), action execution (e.g., causing interaction with objects), zooming, locomotion, and others. Further, smart phone 120 and smart watch 125 can emulate the VR user's 125 hands (or a virtual device) within virtual gameplay. For example, the smart phone 120 can be used to control the user's right hand movements and the smart watch 125 can be used to control the user's left hand movements.

It is noted that FIG. 1 is intended to depict the representative major components of an example VR environment 100. In some embodiments, however, individual components can have greater or lesser complexity than as represented in FIG. 1, components other than or in addition to those shown in FIG. 1 can be present, and the number, type, and configuration of such components can vary. Thus, the configuration of the system can vary, and aspects of the present disclosure are not limited to any particular arrangement described. For example, in embodiments, the VR environment 100 may only include the smart phone 120 and not the smart watch 125. Embodiments can include more or less sensors. In embodiments, additional display devices may be present within the VR environment 100 (e.g., a monitor can mirror VR content displayed on the VR HMD 105).

Figure 2:
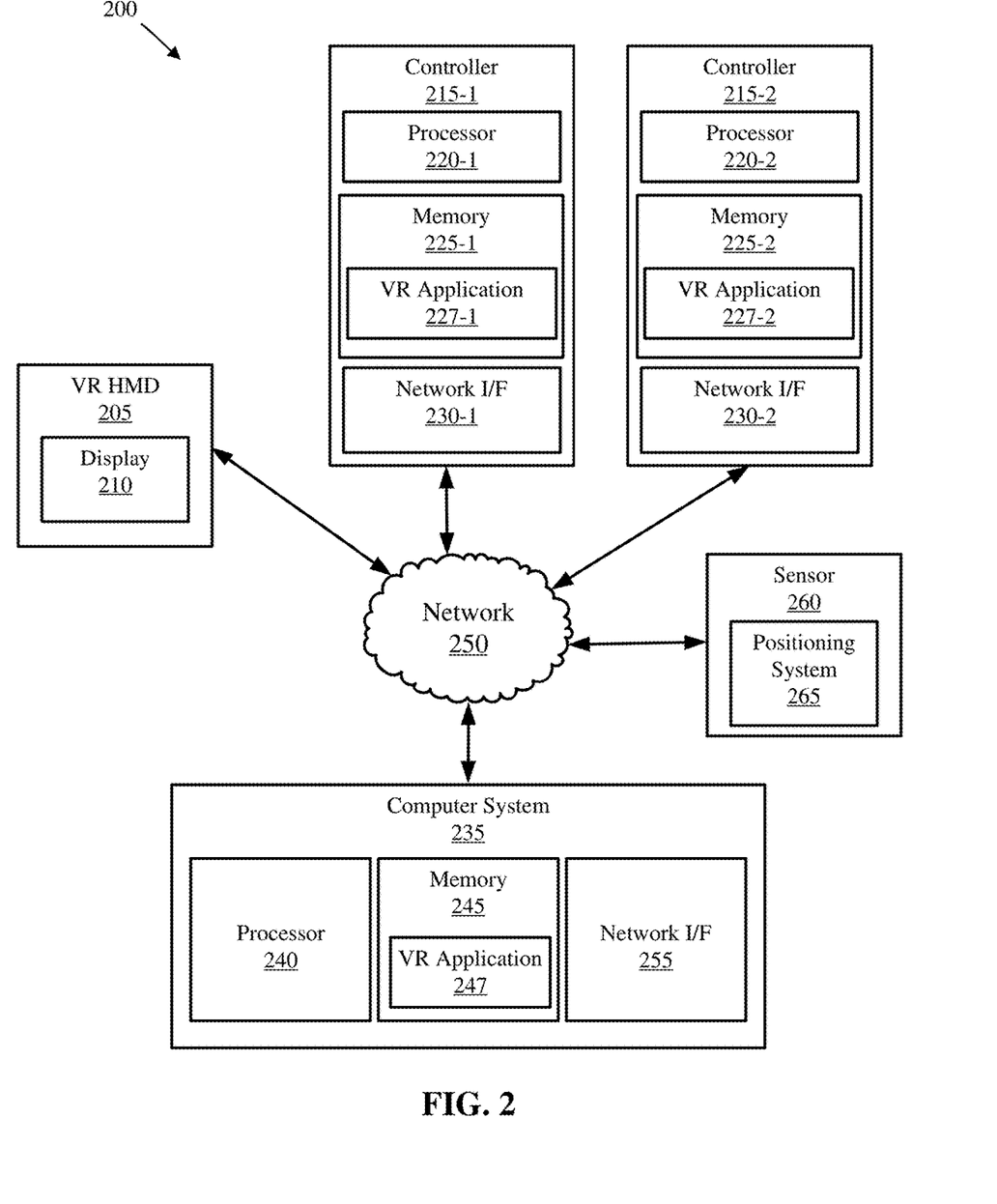
FIG. 2 depicts a block diagram of an example computing environment in which illustrative embodiments of the present disclosure can be implemented.

Turning now to FIG. 2, shown is a block diagram illustrating an example computing environment 200 in which illustrative embodiments of the present disclosure can be implemented. Computing environment 200 includes a VR HMD 205, a first controller 215-1, a second controller 215-2 (collectively referred to as controllers 215), at least one computer system 235, a sensor 260, and a network 250.

The controllers 215 and the computer system 235 include one or more processors 220-1, 220-2 (collectively referred to as processors 220), and 240 and one or more memories 225-1, 225-2 (collectively referred to as memories 225), and 245, respectively. Further, the VR HMD 205 and sensor 260 can each include one or more processors and memories (not shown). The controllers 215 and the computer system 235 are configured to communicate with each other through internal or external network interfaces 230-1, 230-2 (collectively referred to as network interfaces 230), and 240. The network interfaces 210 and 240 are, in some embodiments, modems or network interface cards. Further, the VR HMD 205 and sensor 260 can each include one or more network interfaces (not shown) to facilitate communication over network 250. The controllers 215 and/or the computer system 235 can be equipped with a display. Additionally, the controllers 215 and/or the computer system 235 can include optional input devices (e.g., a keyboard, mouse, scanner, video camera, etc.), and/or any commercially available or custom software (e.g., browser software, communications software, server software, natural language processing software, search engine and/or web crawling software, VR software, etc.).

In embodiments, the controllers 215 can be mobile devices used to control VR use. Example mobile devices include smart phones, tablets, and wearables. The computer system 235 can be a VR-ready machine configured to load and execute VR programs, perform VR graphic rendering, and perform VR gameplay processing. As such, VR content can be displayed on a display 210 of the VR HMD 205 using the processing power of the computer system 235. The sensor 260 can include a positioning system 265 configured to locate components within the computing environment. For example, the positioning system 265 can be configured to locate controllers 215, VR HMD 205, and computer system 235 using indoor positioning system technologies (e.g., Wi-Fi based positioning systems, Bluetooth based positioning systems, angle of arrival, time of arrival, received signal strength indication (RSSI), and others). By tracking devices associated with the computing environment 200, corresponding positional adjustments can be simulated within VR gameplay based on the physical movements of devices.

The controllers 215, VR HMD 205, sensor 260 (collectively referred to as "devices"), and the computer system 235 can be distant from each other and communicate over the network 250. In some embodiments, the computer system 235 can be a central hub from which devices can establish a communication connection, such as in a client-server networking model. Alternatively, the computer system 235 and devices can be configured in any other suitable networking relationship (e.g., in a peer-to-peer (P2P) configuration or using any other network topology).

The network 250 can be implemented using any number of any suitable communications media. For example, the network 250 can be a wide area network (WAN), a local area network (LAN), an internet, or an intranet. In certain embodiments, the devices and the computer system 235 can be local to each other and communicate via any appropriate local communication medium. For example, the devices and the computer system 235 can communicate using a local area network (LAN), one or more hardwire connections, a wireless link (e.g., Bluetooth®) or router, or an intranet. In some embodiments, the devices and the computer system 235 can be communicatively coupled using a combination of one or more networks and/or one or more local connections. For example, the VR HMD 205 can be hardwired (e.g., using HDMI and/or USB links) to the computer system 235 while the sensor 260 can communicate with the computer system 235 using a wireless link, such as Bluetooth.

In some embodiments, the network 250 is implemented within a cloud computing environment or using one or more cloud computing services. Consistent with various embodiments, a cloud computing environment can include a network-based, distributed-data processing system that provides one or more cloud computing services. Further, a cloud computing environment can include many computers (e.g., hundreds or thousands of computers or more) disposed within one or more data centers and configured to share resources over the network 250.

The first controller 215-1, second controller 215-2, and computer system 235 include VR applications 227-1, 227-2, and 247 (collectively referred to as "VR applications"), respectively. The VR applications can be configured to provide various functionalities such that VR gameplay can be achieved using devices within the system. The VR application 247 of the computer system 235 can be configured to load and execute VR games/apps, perform monitoring, pairing, and updates (e.g., firmware updates) of the controllers 215-1 and 215-2, VR HMD 205, and sensor 260, provide rules for the "play area" (e.g., seated, standing, room-scale, etc.) for which a user engages in VR use, and facilitate setting changes (e.g., graphic settings such as supersampling and motion smoothing, audio settings, and layout settings) made by a user.

The VR applications 227-1 and 227-2 can be configured to provide functionalities such that the controllers 215-1 and 215-2 can control VR gameplay. That is, the controllers 215-1 and 215-2 can receive user inputs and transmit the user inputs to the computer system 235 such that VR gameplay (displayed on VR HMD 205) can be controlled. In embodiments, the VR application 247 provides updates to the VR applications 227-1 and 227-2 such that devices emulating the controllers 215-1 and 215-2 are properly configured to control VR use (e.g., a given input leads to a desired output).

Figure 4:
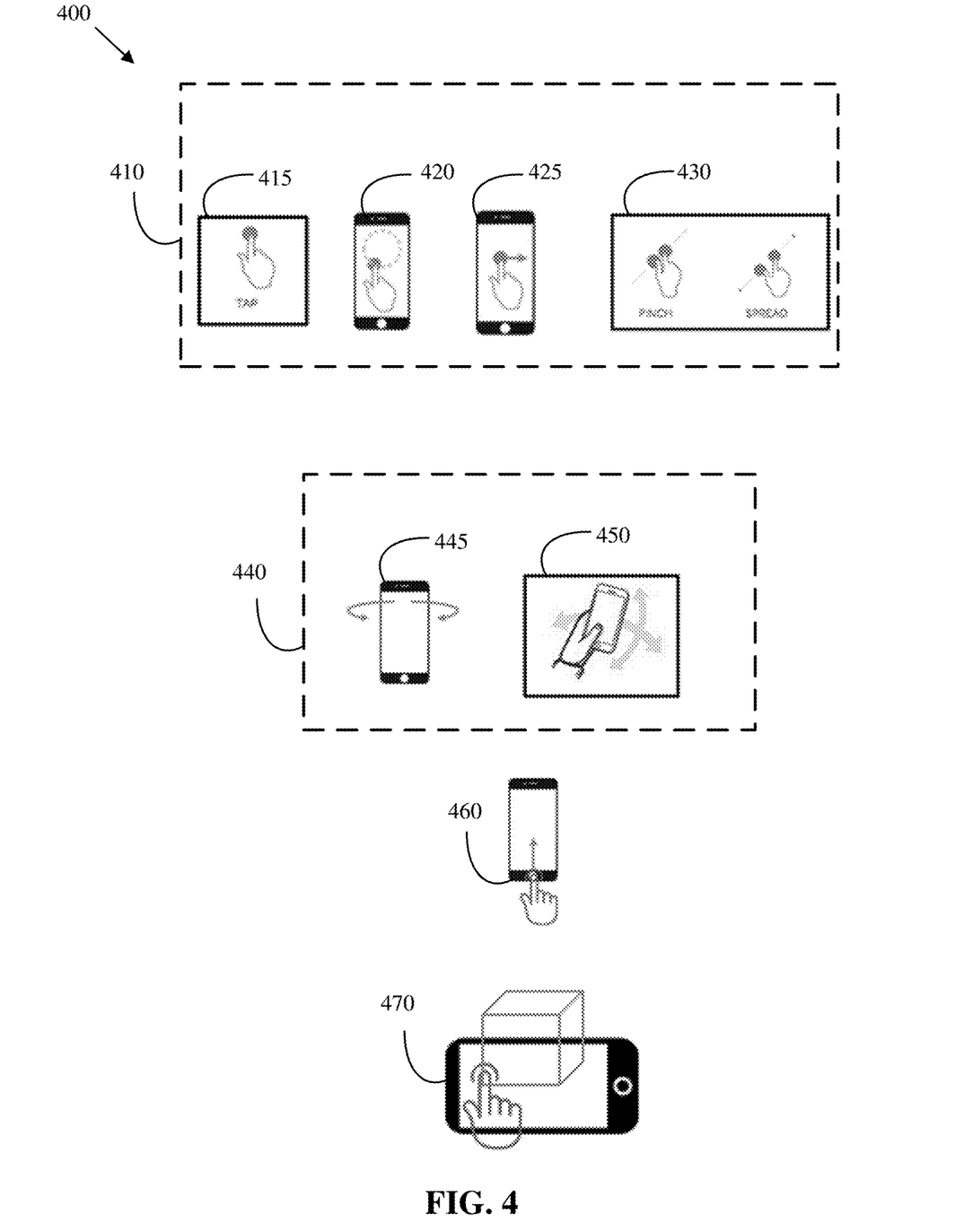
FIG. 4 is a pictorial diagram illustrating various controls which can be used to control virtual reality content, in accordance with embodiments of the present disclosure.

Examples of inputs that can be used to control VR use include touch-based interactions (e.g., a user interacting with a touch screen on a mobile device), tilt-based interactions (e.g., a user tilting a device which leads to a corresponding control), inertial-based interactions (e.g., a user moving a device which leads to a corresponding control), bezel-based interactions (e.g., a user interacting with a bezel portion of a mobile device, see bezel-based controls 460 of FIG. 4), and in-air interactions (e.g., a user interacting in-air over a mobile device which can be captured by cameras or sensors (of the mobile device or a separate device) and translated into a corresponding output). Examples of outputs that can be achieved based on the received inputs include action execution (e.g., interacting with an object within VR, such as picking up an item), aiming, moving, panning, zooming, locomotion and others within virtual reality.

While FIG. 2 illustrates a computing environment 200 with a single computer system 235, suitable computing environments for implementing embodiments of this disclosure can include any number of computer systems. The various models, modules, systems, and components illustrated in FIG. 2 can exist, if at all, across a plurality of computer systems and devices. For example, some embodiments can include two computer systems. The two computer systems can be communicatively coupled using any suitable communications connection (e.g., using a WAN, a LAN, a wired connection, an intranet, or the Internet).

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary. Thus, the configuration of the system can vary, and aspects of the present disclosure are not limited to any particular arrangement described. For example, in some embodiments the computer system 235 may be integrated with the VR HMD 205.

Figure 3:
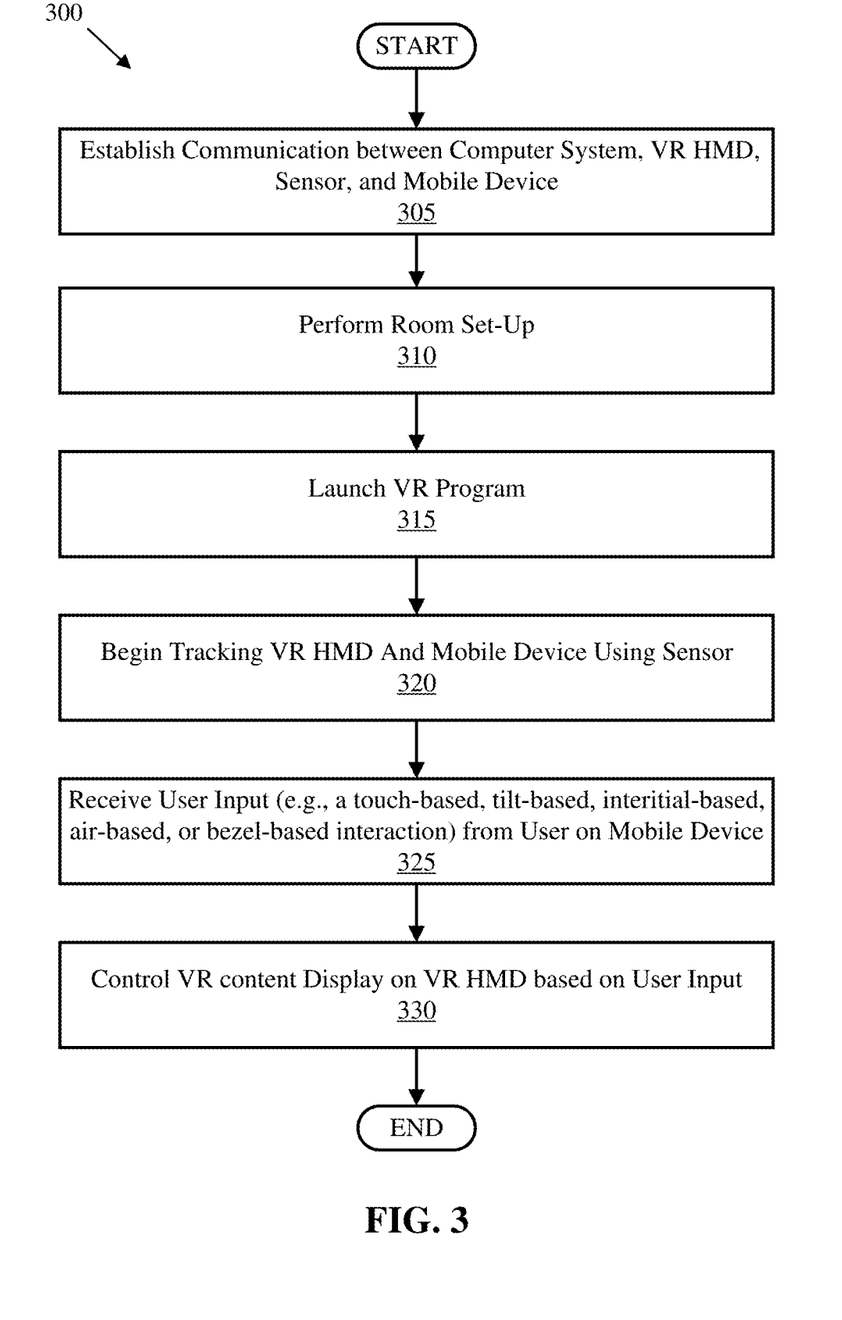
FIG. 3 is a flow diagram illustrating a process for controlling virtual reality using a mobile device, in accordance with embodiments of the present disclosure.

Referring now to FIG. 3, shown is an example process 300 for controlling VR content displayed on a VR HMD using a mobile device, in accordance with embodiments of the present disclosure.

Process 300 initiates at operation 305, where communication is established between a computer system, a VR HMD, a sensor (optionally), and a mobile device. Any communication techniques described with respect to the network 250 of FIG. 2 can be used to interconnect the above-mentioned components. In embodiments, one or more hardwired connections can be established between devices within the system. For example, an HDMI and/or USB connection can be configured to interconnect the computer system to the VR HMD (e.g., to allow rapid transfer of graphic data). In embodiments, a wireless connection can be established between the computer system, the mobile devices, and the sensors (e.g., facilitating indoor positioning as well as data transfer).

A room set-up is then performed at operation 310. In embodiments, the room set-up can include a user tracing (e.g., using a mobile device) a boundary defining an area where VR use is safe. This boundary can then be displayed to the user during VR use, allowing the user to move freely within the boundary without colliding with nearby objects. In some embodiments, room-set up can include designating a stand-still or sitting configuration in which a user is not anticipated to move, bypassing the need for a VR boundary. In these embodiments, the room set-up can include designating a stationary point and determining a height of the VR HMD and the ground level (e.g., via IPS tracking) such that the virtual gameplay can be properly displayed.

A VR program is then launched. This is illustrated at operation 315. Any suitable VR program can be launched, including video games, mapping and navigation applications, artwork applications, word processing applications, and others. Launching the VR program can cause the VR HMD to begin displaying data as processed by the computer system.

Tracking of the VR HMD and mobile device using the sensor then begins at operation 320. Tracking can include utilizing IPS technology to locate the position of the VR HMD and the mobile device in real time. This can be used to update the location of the HMD and mobile device within virtual reality. This can further be used to track a user's location with respect to a virtual boundary to prevent the user from colliding with objects.

User input is then received from a user on the mobile device. This is illustrated at operation 325. The user input can be received by the computer system and used to control VR gameplay while the user is immersed in VR. Examples of inputs that can be used to control VR use include touch-based interactions, motion-based interactions, bezel-based interactions, and in-air interactions.

In embodiments, the display on the mobile device can be mirrored within the virtual environment to aid the user in selecting control options. For example, if a touchscreen GUI is displayed on the mobile device, but is not visible to the user (because the user is wearing a VR HMD), the touchscreen GUI can be mirrored into the virtual environment such that the user can see the available control options on the touchscreen GUI within virtual reality. In some embodiments, the content that would be displayed on the mobile device may only be displayed in virtual reality, as it is not necessary for viewing outside of virtual reality.

VR content displayed on the VR HMD is then controlled based on the user input. This is illustrated at operation 330. Examples of controls that can be achieved based on the received inputs include action execution (e.g., interacting with an object within VR, such as picking up an item), aiming, moving, panning, zooming, and others within virtual reality.

The aforementioned operations can be completed in any order and are not limited to those described. Additionally, some, all, or none of the aforementioned operations can be completed, while still remaining within the spirit and scope of the present disclosure.

Referring now to FIG. 4, shown is a pictorial diagram illustrating various controls 400 that can be used to control VR content displayed on a VR HMD, in accordance with embodiments of the present disclosure. The controls 400 include touch controls 410, motion controls 440, bezel-based controls 460, and in-air controls 470.

Touch controls 410 are generally defined as controls that are initiated based on a touch input received on a touchscreen. Any suitable touch screen can be implemented, including resistive, surface acoustic wave, and capacitive touchscreens. Various touch controls can be implemented, and those shown are not intended to limit other possible touch controls that may be implemented. Touch controls 410 include, among other types, tap controls 415, touch dial controls 420, drag controls 425, and pinch/spread controls 430.

Tap controls 415 are controls that initiate in response to a tap on a touch screen received from a user. Tap controls 415 can be used to interact with objects within virtual reality (e.g., tapping on a screen can lead to a corresponding action such as "pick up" item). Tap controls 415 can further be used to zoom (e.g., a tap or double tap can lead to a zoom action) within virtual reality. Tap controls 415 can also be used to alter one or more views within virtual reality. As an example, based on the location on the touch screen the tap is registered, the view within VR can be altered. In some embodiments, tap controls 415 can be used to control VR locomotion. For example, tap controls 415 can be used to produce a smooth motion movement or a teleport movement within virtual reality.

Touch dial controls 420 are a type of controls that generate a digital dial on the touchscreen of a device. The position of the user's touch along the digital dial leads to a particular output. For example, the digital dial may include various options disposed along the circumference of the dial. As an example, there may be a first control $C_1$ at 0 degrees on the dial, a second control $C_2$ at 90 degrees on the dial, a third control $C_3$ at 180 degrees on the dial, and a fourth control $C_4$ at 270 degrees on the dial. In this example, if the user's touch contacts the dial at 90 degrees, the second control $C_2$ can be selected. Thus, touch dial controls can be particularly useful when attempting to select from a plurality of options (e.g., items in an inventory, controls on a control panel, etc.). In embodiments, as it may be helpful to see the touch dial, the touch dial can be displayed within virtual reality to aid with user control.

Drag controls 425 include inputs received based on a drag motion made on a touch screen. In embodiments, drag controls 425 can be used to control views within virtual reality. For example, drag controls can be used for aiming and panning. In embodiments, drag controls 425 can also be useful for VR locomotion. For example, drag controls 425 can be used for "pull" locomotion (e.g., pulling the virtual reality world in response to a drag control resulting in displacement of the user within virtual reality). In embodiments, drag controls 425 can be used to scroll (e.g., on a virtual scroll bar) through a list of available options. Drag controls 425 can also be used to control/manipulate objects within VR. However, drag controls 425 can be utilized in any other suitable manner.

Pinch/spread controls 430 include inputs received based on two contact points of a touch screen being touched and thereafter moved together or apart from each other. As depicted in pinch/spread controls 430 of FIG. 4, a pinch control includes moving two contact points on the touch screen closer together, while a spread control includes spreading two contact points apart from each other. Pinch/spread controls can be used for zooming within virtual reality (e.g., a pinch leads to zooming in, while a spread leads to zooming out). However, pinch/spread controls can be used in any other suitable manner. For example, pinch control can be used for forward locomotion within virtual reality while a spread control can be used for backward locomotion within virtual reality.

Motion controls 440 generally refer to inputs generated in response to particular movements of mobile devices being made. These include, among other types of motion controls 440, tilt controls 445 and inertial controls 450. Tilt controls 445 can be produced in response to changing an angle of a mobile device (e.g., tilting the device upward, downward, leftward, or rightward). In embodiments, a tilt sensor such as an accelerometer or gyroscope can be used to detect tilt of the device. In embodiments, tilt controls 445 can be used for aiming (e.g., changing a viewing angle from a first or third person perspective) within virtual reality. For example, the view within VR can directly mirror the orientation of the mobile device. In embodiments, tilt controls can be used for steering (e.g., in a virtual racing, flying, and boating games). In embodiments, tilt controls can be used to implement action execution. For example, tilting the mobile device can lead to performing a particular action (e.g., sprint) within VR. However, tilt controls 445 can be utilized in any other suitable manner.

Inertial controls 450 can be produced in response to a movement of a device being made. In embodiments, the movement of the device can be detected using an accelerometer and/or gyroscope. Inertial controls 450 can be used for changing viewing angles (e.g., aiming and panning) based on the movement of the mobile device. Further, inertial controls can be used for action execution (e.g., a particular movement leads to a particular action, such as "jump"). In embodiments, inertial controls can be used to control movement of left and right hand actions of a VR user. That is, the movement of the mobile devices (e.g., as held by a left and right hand) can lead to corresponding movements within virtual reality.

Bezel-based controls 460 include controls that produce an input in response to interaction with an area not included on the touch screen of a mobile device (e.g., a bezel portion). Common bezel-based controls include interaction with a "home" button (depicted in bezel-based controls 460 of FIG. 4), interaction with a "lock button", interaction with volume controls, and others. Though bezel-based controls 460 are not included on the touch screen portion of a mobile device, they still may include touch-based input controls. For example, "home" buttons on smart phones typically include touch sensors such that touch controls can be utilized. Various controls can be completed using bezel-based controls. For example, if the bezel portion of a smart device includes a "home" button with a touch pad, touch controls 410 described above can be completed using the "home" button. Bezel-based controls 460 can be used for altering viewing angles, action execution, and locomotion, among other control options.

In-air controls 470 include controls that produce an input in response to a particular gesture (e.g., hand or body gestures) made above the screen of a mobile device. In-air controls 470 take advantage of advanced depth cameras (e.g., a front facing camera on a mobile device) and sensors such that gestures made in-air (above a mobile device) can be captured and translated into a particular input within virtual reality. "In-air" generally refers to an input that is touchless.

In-air controls 470 can be used to control various aspects of VR. In some embodiments, in-air controls 470 can be used for locomotion. For example, if a user points their finger above the screen, forward movement can be completed. In some embodiments, in-air controls 470 can be used for action execution (e.g., a particular gesture "fist" can lead to a particular action "crouch"). In some embodiments, in-air controls 470 can be used to control viewing angles (e.g., a hand wave can lead to panning in the direction of the hand wave, a pointing finger above the mobile device can lead to aiming in the direction of the finger, etc.).

In some embodiments, in-air controls 470 can be used for three dimensional (3D) object construction. For example, a user tracing a particular object in-air (i.e., an in-air trace pattern) above their mobile device can lead to a corresponding 3D object being generated within virtual reality (e.g., the square depicted in in-air controls 470 of FIG. 4). In embodiments, the size of the traced object can be scaled up within virtual reality.

In embodiments, the depth and/or speed at which the in-air interaction occurs influences the output on the VR HMD. For example, a fast hand gesture can lead to fast panning, while a slow hand gesture can lead to slow panning. Similarly, a gesture close to the screen can lead to zooming in, while a gesture far from the screen can lead to zooming out.

In embodiments, various different controls 400 can be simultaneously used to control virtual reality content displayed on a VR HMD. Reference will now be made to various gameplay examples including various controls discussed above. According to a first example, such as in a first-person game, tilt controls 445 can be used to control viewing angles of VR gameplay, drag controls 425 can be used to move objects within VR gameplay, and a bezel-based controls 460 can be used to control locomotion of a user. Further, according to this example, tap controls 415 can be used to complete actions. For example, a "double tap" can lead to a first action (e.g., crouch) while a "hold and press" tap can lead to a second action (e.g., change item) within virtual reality. Further still, dial controls 420 can aid with option selection (e.g., "open door" or "walk away") when confronted with multiple options.

According to a second example, such as in a 3D map viewer (e.g., such as GOOGLE EARTH C)), drag controls 425 can be used for panning (e.g., camera movement along a horizontal plane) and pinch/spread controls 430 can be used for zooming in and out. In some embodiments, however, in-air controls 470 can be used to control panning and zooming. For example, a finger drag in-air can control panning. The speed at which the user's finger moves above the screen can be detected by a front-facing camera and translate into a corresponding panning speed. In embodiments, the distance at which the user's hand is measured in-air above the mobile device can control the zoom magnification. For example, if the user's hand is close to the mobile device, a zoomed-in configuration can be executed whereas if the user's hand is far from the mobile device, a zoomed-out configuration can be executed.

According to a third example, such as in a construction game (e.g., a house building or city building simulator), in-air controls 470 can be used to construct a 3D structure (e.g., skyscraper or house). For example, in-air tracing of an object can be translated into a scaled up version of a house or skyscraper. In these embodiments, touch controls 410 may be used to select options (e.g., the material or style of the building), motion controls 440 can be used to control viewing angles, and bezel controls 460 can be used produce locomotion (e.g., such that the user can explore the constructed building).

In some embodiments, different controls 400 of multiple devices can be implemented into VR gameplay. As an example, such as in an FPS game, motion controls 440 of a first device (e.g., a smart watch) can be used to control aiming, touch controls 410 of the first device can be used to control a first set of actions (e.g., "crouch"), in-air controls 470 of a second device (e.g., a smart phone) can be used to control a second set of actions (e.g., "change item" or "sprint"), and bezel controls 460 of the second device can be used to control locomotion.

Though reference is made to specific control configurations, any suitable control configuration consistent with the spirit and scope of the present disclosure can be implemented. The controls described above are only exemplary and are not intended to be limiting.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
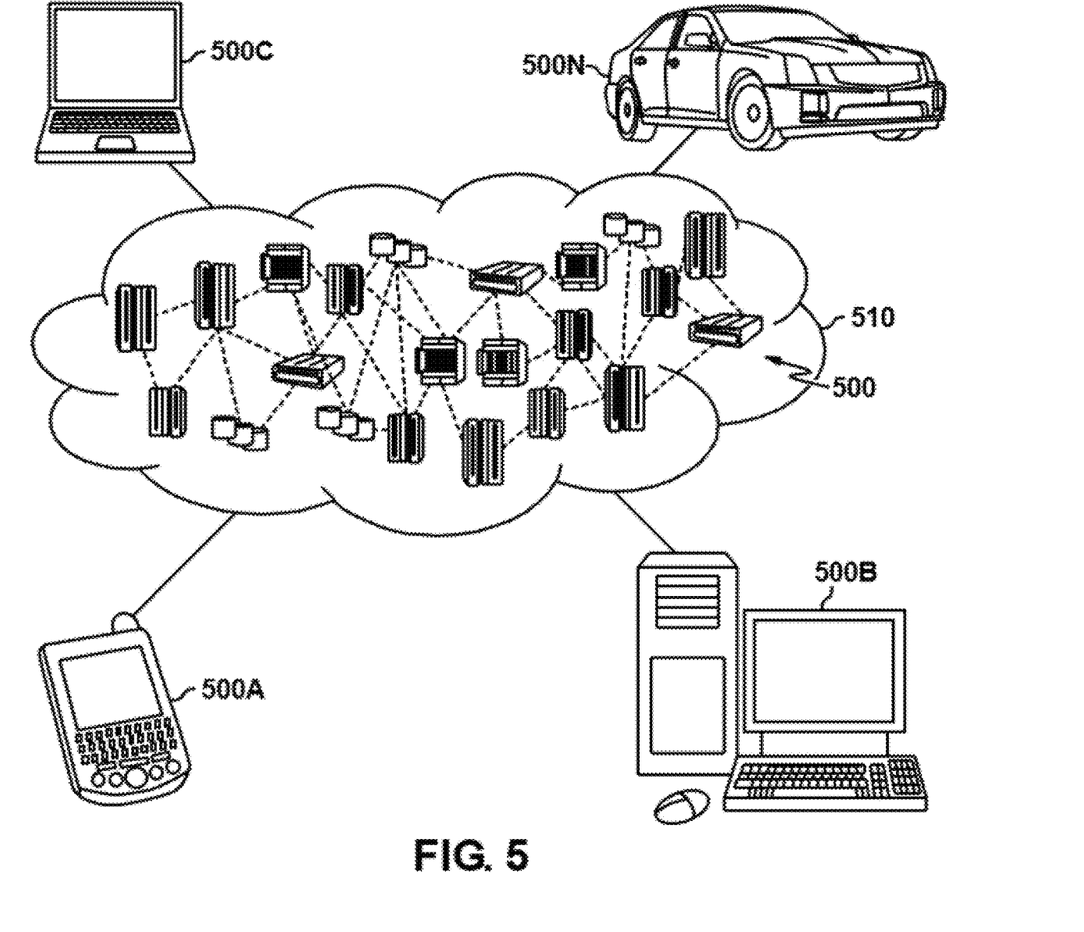
FIG. 5 is a diagram illustrating a cloud computing environment, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A (e.g., controllers 215), desktop computer 500B (e.g., computer system 110 and/or 235) laptop computer 500C (e.g., computer system 110 and/or 235), and/or automobile computer system 500N can communicate. Nodes 500 can communicate with one another. They can be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
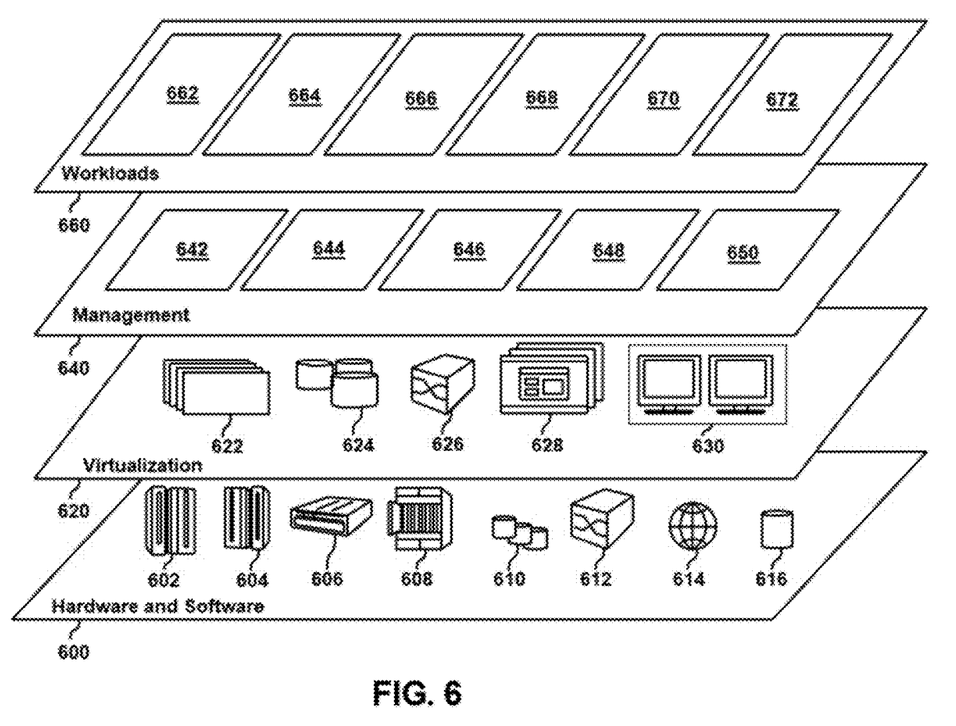
FIG. 6 is a block diagram illustrating abstraction model layers, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities can be provided: virtual servers 622; virtual storage 624; virtual networks 626, including virtual private networks; virtual applications and operating systems 628; and virtual clients 630.

In one example, management layer 640 can provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 can allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment can be utilized. Examples of workloads and functions which can be provided from this layer include: mapping and navigation 662; software development and lifecycle management 664; indoor positioning 666; data analytics processing 668; transaction processing 670; and virtual reality management 672.

Figure 7:
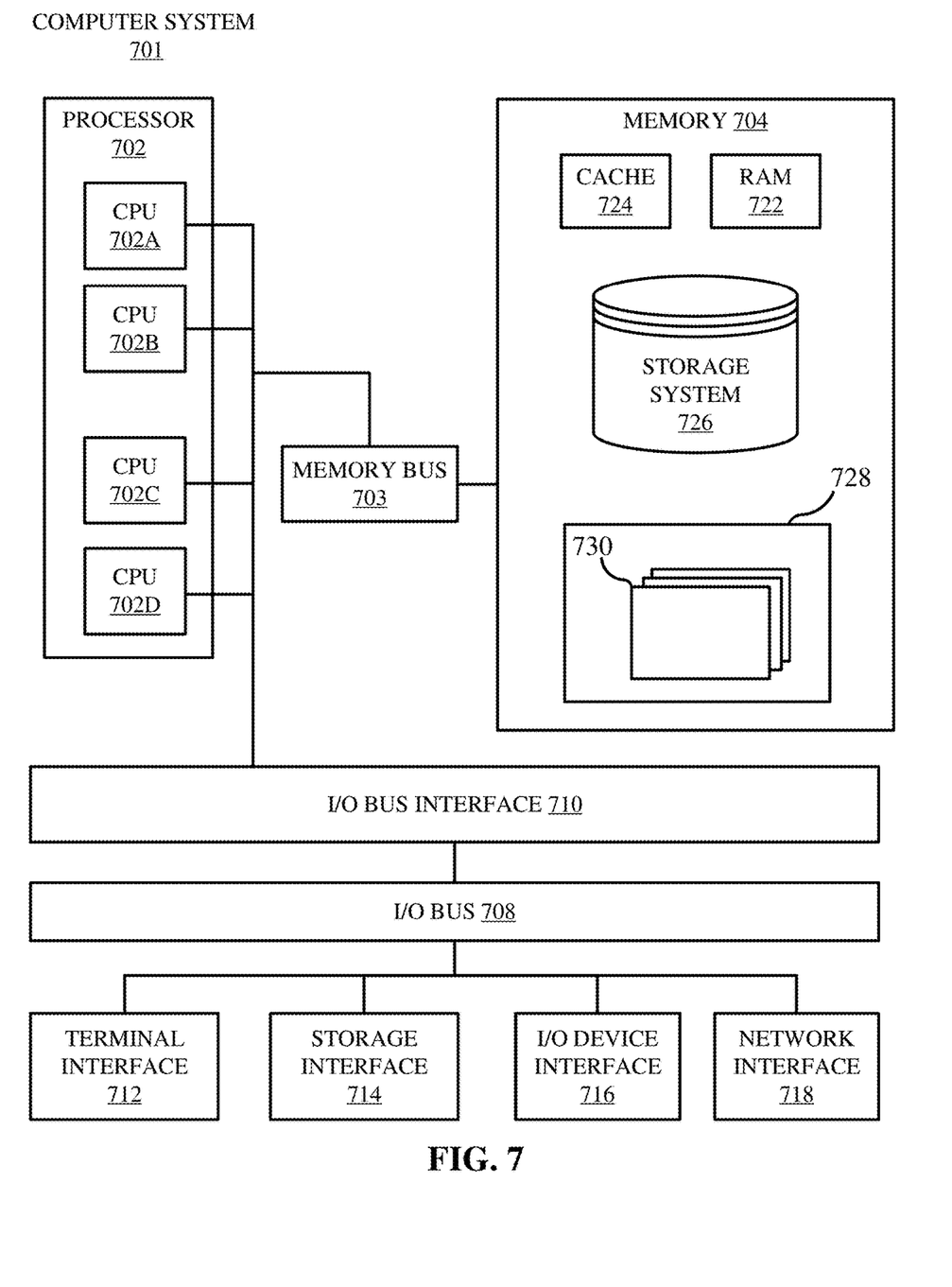
FIG. 7 is a high-level block diagram illustrating an example computer system that can be used in implementing one or more of the methods, tools, and modules, and any related functions, described herein, in accordance with embodiments of the present disclosure.

Referring now to FIG. 7, shown is a high-level block diagram of an example computer system 701 (e.g., computer system 110, controllers 215, computer system 235) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 701 can comprise one or more CPUs 702, a memory subsystem 704, a terminal interface 712, a storage interface 714, an I/O (Input/Output) device interface 716, and a network interface 718, all of which can be communicatively coupled, directly or indirectly, for inter-component communication via a memory bus 703, an I/O bus 708, and an I/O bus interface unit 710.

The computer system 701 can contain one or more general-purpose programmable central processing units (CPUs) 702A, 702B, 702C, and 702D, herein generically referred to as the CPU 702. In some embodiments, the computer system 701 can contain multiple processors typical of a relatively large system; however, in other embodiments the computer system 701 can alternatively be a single CPU system. Each CPU 702 can execute instructions stored in the memory subsystem 704 and can include one or more levels of on-board cache.

System memory 704 can include computer system readable media in the form of volatile memory, such as random access memory (RAM) 722 or cache memory 724. Computer system 701 can further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 can include at least one program product having a set (e.g., at least one) of program modules that are configured to carry out the functions of various embodiments.

One or more programs/utilities 728, each having at least one set of program modules 730 can be stored in memory 704. The programs/utilities 728 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 can, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices can be connected directly to one or more system I/O buses.

In some embodiments, the computer system 701 can be a multi-user mainframe computer system, a single-user system, or a server computer or similar device that has little or no direct user interface, but receives requests from other computer systems (clients). Further, in some embodiments, the computer system 701 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components can have greater or lesser complexity than as represented in FIG. 7, components other than or in addition to those shown in FIG. 7 can be present, and the number, type, and configuration of such components can vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
    establishing communication between a computer system, a virtual reality (VR) head-mounted display (HMD), and a mobile device;
    receiving a user input on the mobile device configured to control VR content displayed on a display of the VR HMD as output by the computer system;
    controlling the VR content displayed on the VR HMD based on the user input received on the mobile device;
    receiving a bezel-based control from a user of the mobile device;
    controlling locomotion of the user within the VR content based on the bezel-based control;
    receiving a touch control from the user of the mobile device; and
    executing a first action within the VR content in response to receiving the touch control.

2. The method of claim 1, wherein the user input is an in-air control.

3. The method of claim 2, wherein a particular gesture made above the mobile device leads to a particular action execution within the VR content.

4. The method of claim 1, further comprising:
    receiving an in-air control from a user of the mobile device;
    controlling a viewing angle of the VR content based on the in-air control.

5. The method of claim 1, further comprising:
    receiving an in-air control from a user of the mobile device;
    executing a first action within the VR content based on the in-air control;
    receiving a motion control from the user on a second mobile device; and
    changing a viewing angle of the VR content based on the motion control.

6. A computer program product comprising a computer readable storage medium having program instructions embodied therewith, wherein the computer readable storage medium is not a transitory signal per se, the program instructions executable by a processor to cause the processor to perform a method comprising:
    establishing communication between a computer system, a virtual reality (VR) head-mounted display (HMD), and a mobile device;
    receiving a user input on the mobile device configured to control VR content displayed on a display of the VR HMD as output by the computer system;
    controlling the VR content displayed on the VR HMD based on the user input received on the mobile device;
    capturing, using a front-facing camera of the mobile device, an in-air control trace pattern from a user of the mobile device; and
    constructing a 3-dimensional virtual object within the VR content based on the in-air control trace pattern.

7. The computer program product of claim 6, wherein the user input is an in-air control.

8. The computer program product of claim 7, wherein a particular gesture made above the mobile device leads to a particular action execution within the VR content.

9. The computer program product of claim 6, wherein the method performed by the processor further comprises:
    receiving a touch control from a user of the mobile device;
    controlling locomotion of the user within the VR content based on the touch control;
    receiving a motion control from a user of a second mobile device; and
    changing a viewing angle within the VR content based on the motion control.

10. The computer program product of claim 6, wherein the method performed by the processor further comprises:
    receiving an in-air control from a user of the mobile device;
    executing a first action within the VR content based on the in-air control;
    receiving a bezel-based control from the user on a second mobile device; and
    changing a viewing angle of the VR content based on the bezel-based control.

11. A system comprising:
    a virtual reality (VR) head-mounted display (HMD);
    a mobile device; and
    a computer system communicatively coupled to the VR HMD and the mobile device, the computer system including at least one memory component and at least one processor, the processor being configured to perform a method comprising:
    receiving a user input from the mobile device configured to control VR content displayed on a display of the VR HMD;
    controlling the VR content displayed on the VR HMD based on the user input received from the mobile device;
    receiving a touch control from a user of the mobile device;
    controlling locomotion of the user within the VR content based on the touch control;

receiving a motion control from a user of a second mobile device; and changing a viewing angle within the VR content based on the motion control.

12. The system of claim 11, wherein the user input is an in-air control.

13. The system of claim 12, wherein a particular gesture made above the mobile device leads to a particular action execution within the VR content.

14. The system of claim 11, wherein the method performed by the processor further comprises:

capturing, using a front-facing camera of the mobile device, an in-air control trace pattern from a user of the mobile device;

constructing a 3-dimensional virtual object within VR based on the in-air control trace pattern;

capturing, using the front-facing camera of the mobile device, an in-air hand gesture from the user of the mobile device; and panning a camera view within the VR content based on the in-air hand gesture.

15. The system of claim 11, wherein the method performed by the processor further comprises:

receiving an in-air control from a user of the mobile device;

executing a first action within the VR content based on the in-air control;

receiving a bezel-based control from the user on a second mobile device;

changing a viewing angle of the VR content based on the bezel-based control.

16. The system of claim 11, wherein the method performed by the processor further comprises:

capturing, using a front-facing camera of the mobile device, a first gesture from a user of the mobile device;

controlling locomotion within the VR content based on the first gesture from the user;

capturing, using the front-facing camera of the mobile device, a second gesture from the user of the mobile device; and changing a camera view within the VR content based on the second gesture.

17. The system of claim 11, further comprising at least one sensor, wherein the method performed by the processor further comprises:

tracking, using the at least one sensor, the mobile device using an indoor positioning system; and updating a location of the mobile device within the VR content based on the tracking.

* * * * *